(12) United States Patent
Basham et al.

(10) Patent No.: US 6,880,040 B2
(45) Date of Patent: Apr. 12, 2005

(54) VIRTUAL SEQUENTIAL DATA STORAGE (VSDS) SYSTEM WITH ROUTER CONDUCTING DATA BETWEEN HOSTS AND PHYSICAL STORAGE BYPASSING VSDS CONTROLLER

(75) Inventors: Robert Beverley Basham, Aloha, OR (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/184,284

(22) Filed: Jun. 27, 2002

(65) Prior Publication Data

US 2004/0003171 A1 Jan. 1, 2004

(51) Int. Cl.⁷ .............................................. G06F 12/00
(52) U.S. Cl. ........................ 711/111; 398/49; 709/217; 709/238; 709/245; 711/111; 711/112; 711/138; 713/150; 713/153
(58) Field of Search ................................ 709/217, 238, 709/245; 398/49; 713/150, 153; 711/111, 112, 138

(56) References Cited

U.S. PATENT DOCUMENTS

| 4,246,637 A | 1/1981 | Brown et al. ............... 364/200 |
|---|---|---|
| 4,924,427 A | 5/1990 | Savage et al. .............. 364/900 |
| 5,131,081 A | 7/1992 | MacKenna et al. ......... 395/275 |
| 5,201,054 A | 4/1993 | Dudhela ...................... 395/800 |
| 5,214,761 A | 5/1993 | Barrett et al. ............... 395/275 |
| 5,539,913 A | 7/1996 | Furuta et al. ............... 395/825 |
| 5,574,862 A | * 11/1996 | Marianetti, II .............. 710/100 |
| 5,890,207 A | 3/1999 | Sne et al. .................... 711/113 |
| 5,996,026 A | 11/1999 | Onodera et al. ............... 710/3 |
| 36,989 A | 12/2000 | Shippy et al. .............. 711/168 |

OTHER PUBLICATIONS

U.S. Appl. No. 09/948,656, filed Sep. 10, 2001, Basham et al.

* cited by examiner

Primary Examiner—Mano Padmanabhan
Assistant Examiner—Mehdi Namazi (57) ABSTRACT

A virtual sequential data storage (VSDS) system includes a VSDS controller coupled to physical data storage and a host machine with at least one host application. The controller is configured to carry out commands from the host application referencing VSDS. A router installed at the host intercepts prescribed types of host application commands directed to the controller. For each intercepted read/write command, the router determines a target physical location in physical data storage to carry out the intercepted host read/write command. Also, if the host application command is a read command, the router transfers data requested by the read command from the target physical location to the host application bypassing the controller. If the host application command is a write command, the router transfers write data associated with the write command from the host application to the target physical location bypassing the controller.

25 Claims, 6 Drawing Sheets

VIRTUAL SEQUENTIAL DATA STORAGE (VSDS) SYSTEM WITH ROUTER CONDUCTING DATA BETWEEN HOSTS AND PHYSICAL STORAGE BYPASSING VSDS CONTROLLER

BACKGROUND OF THE INVENTION

1. Field of the Invention

The present invention relates to data storage subsystems employing a controller to store data on a various physical media while representing to host applications that data is always stored in sequential storage media such as portable magnetic tape cartridges. A router satisfies selected host commands without involving the controller. For instance, the router carries out host read/write commands by conducting data between physical data storage and the host, bypassing the controller and thereby reducing controller workload.

2. Description of the Related Art

A typical virtual tape subsystem (VTS) utilizes a VTS controller along with some disk and tape storage. The VTS controller manages physical data storage of data upon disk and tape, while representing to host applications that data is exclusively stored on portable items of media such as tape cartridges. The VTS subcomponents are configured such that all data moves through the controller. Namely, data to/from the host always passes through the controller. From the controller, data moves to/from disk. According to an appropriate destaging algorithm invisible to the hosts, the controller moves data from disk to tape. Since all data passes through the controller, the controller becomes a bottleneck for data movement.

Various outboard data copy techniques are known. Generally, these techniques utilize a separate processor or program to move data from source to destination, thereby relieving a targeted application from this workload. One example is the SCSI Extended Copy (XCOPY) command. The VTS controller may experience some relief by invoking XCOPY or another outboard data copy technique to transfer data from disk to tape when required. Despite this aid to the controller in regard to disk-tape or tape-disk transfers, the VTS controller is still an essential bottleneck for hosts' read/write requests. Namely, write data necessarily passes from the host to disk/tape through the VTS controller, and read data necessarily passes from disk/tape through the VTS controller to the host.

Routing all data through the VTS controller in this manner places a significant burden on the VTS controller, ultimately delaying completion of host read/write operations. From a host (customer) perspective, this is undesirable because it forces host applications to wait longer to read and write data. From a system design standpoint, the VTS controller bottleneck issue is undesirable because read/write speed is an important property that determines whether a VTS product will be competitive in the marketplace. It is essential to invoke the VTS controller, however, because the VTS controller oversees the arrangement of data on disk/tape, including storage addresses, maps between virtual and physical locations, and other metadata. Consequently, from the standpoint of read/write speed, known VTS type data storage systems still have certain unsolved limitations.

SUMMARY OF THE INVENTION

A virtual sequential data storage (VSDS) system includes a VSDS controller coupled to physical data storage and a host machine with at least one host application. The controller is configured to carry out commands from the host application referencing VSDS. A router application ("router"), installed at the host, intercepts prescribed types of host application commands directed to the controller. For each intercepted host read/write command, the router determines a target physical location in physical data storage to carry out the intercepted read/write command. Also, if the host application command is a read command, the router transfers data requested by the read command from the target physical location to the host application bypassing the controller. If the host application command is a write command, the router transfers write data associated with the write command from the host application to the target physical location bypassing the controller.

The invention affords its users with a number of distinct advantages. The router, bypassing the VSDS controller by conducting data directly between physical data storage and hosts, significantly reduces controller workload. Consequently, the router helps the system more rapidly satisfy host requests involving the access of data in physical data storage. And, with its reduced workload, the controller is generally available to more quickly satisfy all different types of host requests. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

Overview

Figure 1:
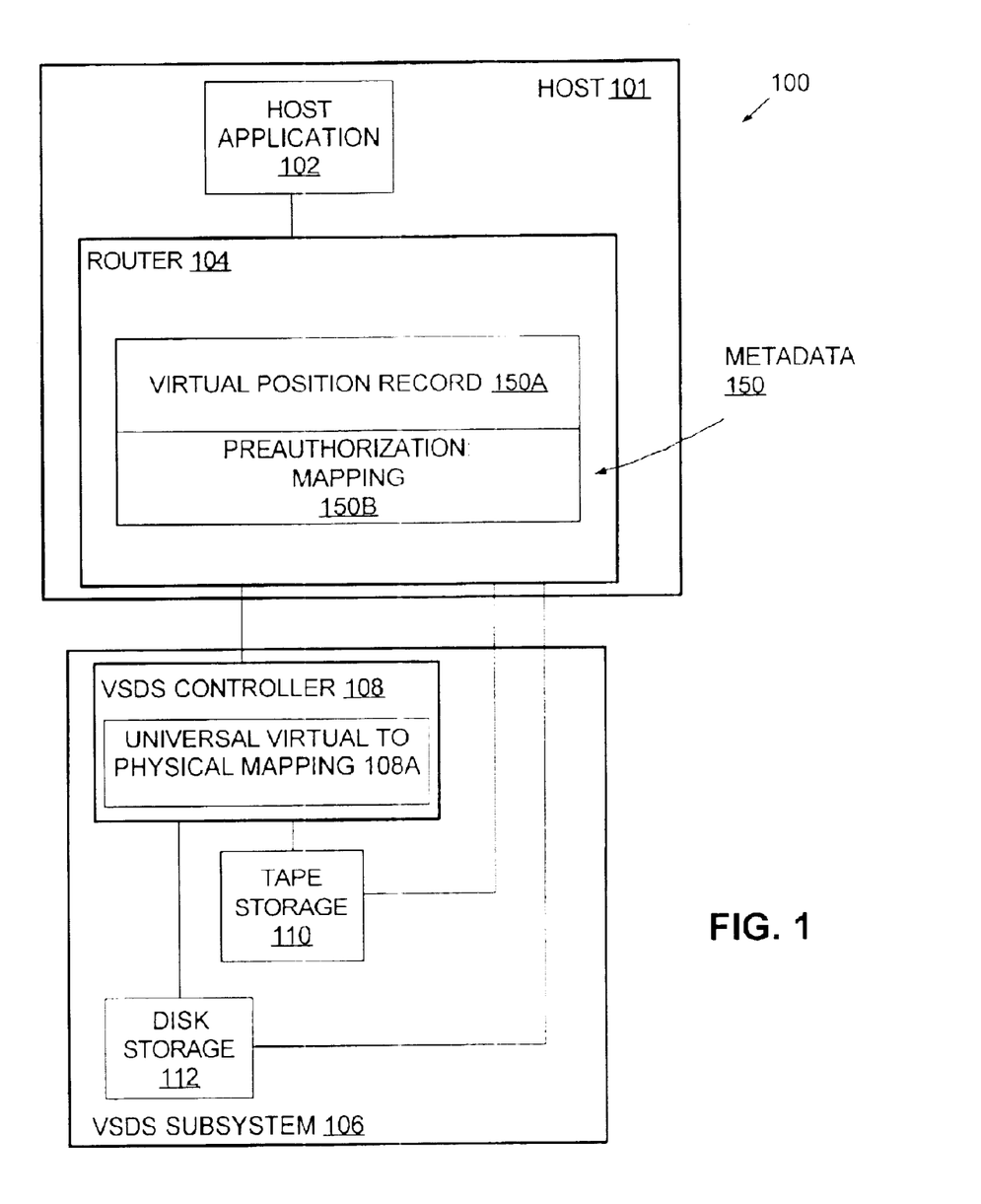
FIG. 1 is a block diagram of the hardware components and interconnections of a VSDS system.

One aspect of the present disclosure concerns a virtual sequential data storage (VSDS) system, which may be embodied by various hardware components and interconnections, with one example being described by the system 100 of FIG. 1. Broadly, the system 100 includes a host 101 and a VSDS subsystem 106. The host 101 includes a host application 102 and a router application 104 ("router"). The VSDS subsystem 106 includes a VSDS controller 108 and one or more types of physical data storage, such as disk 112 and tape 110 in the illustrated example. The router 104 includes metadata 150, further broken down into a virtual position record 150a and preauthorization mapping 150b.

Host

The host 101 comprises a digital data processing machine such as a custom computer, computer workstation, personal computer, mainframe computer, microprocessor, or other suitable machine. The host application 102 comprises an application program, processing thread, computing machine, user terminal, communications link, or other hardware and/or software construct providing a source of commands directed at the VSDS controller 108. Commands from the host application 102 are directed at "virtual" data storage, that is, an imaginary data storage system of tape or other imaginary, sequential media. In other words, the host application 102 lacks knowledge of the number, makeup, layout, and other characteristics of the physical devices in 110, 112. Rather, the host application 102 references virtual ("logical") addresses in an imaginary sequential data storage system, where the VSDS controller 108 (as discussed below) translates between host-oriented logical addresses and the physical addresses on the physical devices 110, 112.

Router

The router 104 comprises software running on the host 101 to selectively satisfy host commands without the necessity of involving the VSDS controller 108. Accordingly, the router 104 is functionally and/or physically interposed between the host application 101 and the controller 108. Among other duties, the router 104 satisfies host read/write commands by conducting the read/write data between the physical data storage 110, 112 and the host application 102 bypassing the controller 108. The operation of the router 104 is described in greater detail below.

As a specific example, the router 104 may comprise a device driver installed on the host 101 in connection with the host application 102. Alternatively, the router 104 may comprise a computer, customized integrated circuit, logic circuit, firmware, software, or other hardware and/or software construct to implement the disclosed functions, whether this construct is part of the host 101 or not.

The router 104 includes metadata 150, which includes a virtual position record 150*a* and preauthorization mapping 150*b*. The router 104 utilizes the record 150*a* to store the current virtual media position, also referred to as the current VSDS position. The current virtual media position is the position of the virtual sequential media, analogous to tape position. As discussed below, the router 104 and/or controller 108 keeps track of virtual media position like a tape controller keeps track of tape position. This aids in answering inquiries from the host application 102 about the current virtual media position, and also aids in carrying out "change position" commands from the host application 102.

The router 104 utilizes the preauthorization mapping 150*b* to store a listing of preauthorized (described below) virtual sequential media positions, as well as their corresponding physical positions on tape 110 and/or disk 112. The virtual sequential media positions in the mapping 150*b* constitute the extent of preauthorization. If preauthorization is affirmatively revoked or invalidated, the mapping 150*b* may contain a blank, null, or other predetermined pattern or content in the mapping 150*b*; alternatively, or in addition, the record 150*a* may have a null, blank, or other predetermined content.

Contents of the preauthorization mapping 150*b* are described in greater detail as follows. In the case of physical disk storage 112, one embodiment of the mapping 150*b* cross-references subparts of virtual storage (identified according to virtual drive, virtual address, and virtual length) against subparts of the physical disk storage 112 (identified according to physical sector, physical track, etc.) In the case of physical tape storage, the mapping 150*b* cross-references subparts of virtual storage (identified as mentioned above) against subparts of the physical tape storage 110 (identified according to physical drive, physical address, and physical length). In an alternative embodiment, the router 104 and controller 108 may refer to an abstraction of physical data storage 110, 112 instead of sites on physical storage media. One example of such abstraction is "files." In this case, the mapping 150*b* cross-references subparts of virtual storage (identified as mentioned above) against such files. Reference to sites on physical data storage media (such as sector/track) are made by lower level translation applications (not shown) that are included as part of the router 104 and controller 108 or accessible thereto. The reference to files or another such abstraction of physical data storage is still contemplated by references herein to locations in "physical" storage.

VSDS Subsystem 106

The VSDS subsystem 106 includes the VSDS controller 108, disk storage 112, and tape storage 110. The controller 108 comprises a data processing entity such as a computer, computer workstation, mainframe computer, microprocessor, or other suitable construct. The controller 108 maintains a universal mapping 108*a* cross-referencing all virtual sequential locations to their counterpart physical locations in physical data storage 110, 112. Contents of the universal mapping 108*a* are analogous to contents of the mapping 150*b* described above except that the mapping 108*a*, as a central part of the controller's management of the VSDS subsystem 106, covers all virtual positions regardless of preauthorization.

The disk storage 112 comprises one or more direct-access storage devices (DASDs) such as hard drive, RAID, circuit memory, or other non-sequential access storage media. In this context, "non-sequential" refers to the characteristic of disk storage 112 that storage addresses may be accessed directly (e.g., moving a head disk assembly to a desired disk track or other "random" access), rather than sequentially (e.g., having to advance and rewind tape to reach desired data). The disk storage 112 may comprise one or multiple devices, or one or more parts of at least one such device. The tape storage 110 comprises sequential (not direct access) storage, such as removable magnetic tape cartridges as utilized in the present example and throughout the following discussion.

Both tape 110 and disk 112 storage are depicted for the sake of completeness of the illustrated example. The VSDS subsystem 106, however, may be implemented with one or the other. Depending upon the particular application at hand, the physical data storage 110, 112 may (but need not be) dedicated to service of VSDS tasks.

Some particular examples of the VSDS subsystem 106 include the various IBM Virtual Tape System (VTS) products such as the IBM 3494 mod B10, B18, or B20 products. Additional details of VTS products are disclosed in IBM U.S. Pat. Nos. 4,467,421, 5,805,864, 5,809,511, and 6,098,148, and in the IBM Redbook publication entitled "IBM Total Storage Virtual Tape Server Planning, Implementing and Monitoring" (ISBN 0738423459, IBM Form Number SG24-2229-04, published Oct. 15, 2001). The foregoing references are hereby incorporated herein by reference in their entireties.

Exemplary Digital Data Processing Apparatus

As mentioned above, processing entities of the system 100 such as the host 101, router 104, VSDS controller 108, and the like may be implemented in various forms. As one example, some or all of these processing entities may be implemented by digital data processing apparatuses as exemplified by the hardware components and interconnections of the digital data processing apparatus 200 of FIG. 2.

Figure 2:
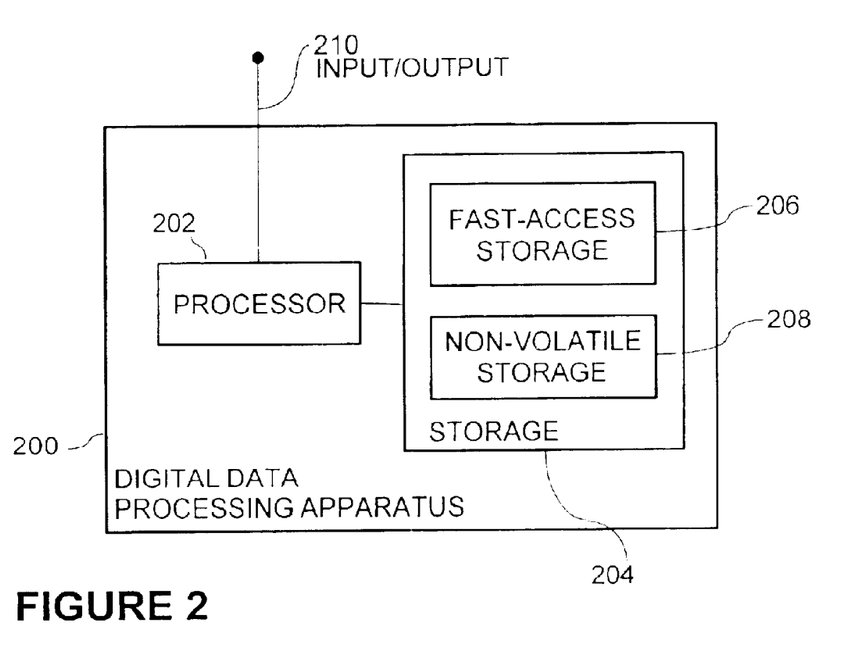
FIG. 2 is a block diagram of a digital data processing machine.

The apparatus 200 includes a processor 202, such as a microprocessor, personal computer, workstation, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement one or more processing entities of the system 100. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features above, an operational aspect of the present disclosure is now described, wherein a router selectively satisfies host commands without involving the VSDS controller. For instance, the router carries out host read/write commands by conducting data between physical data storage and the host, bypassing the controller and thereby reducing controller workload.

Signal-Bearing Media

Figure 3:
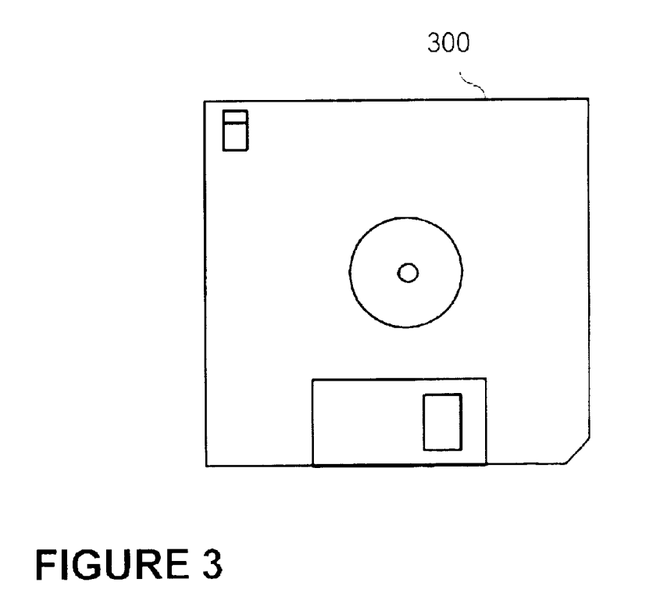
FIG. 3 shows an exemplary signal-bearing medium.

In an embodiment where one or more functional entities, such as the host application 102, router 104, and/or controller 108 comprise machine-executed program sequences, each may be implemented in various forms of signal-bearing media. In the context of FIG. 2, this signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive," redundant array of inexpensive disks ("RAID"), or another DASD), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, the method aspect of the invention may be implemented using logic circuitry, without using a processor to execute instructions. In this embodiment, the logic circuitry is implemented by one or more of the host application 102, router 104, and controller 108, and is configured to perform operations to implement the method of the invention. The logic circuitry may be implemented using many different types of circuitry, as discussed above.

Router Operation—First Embodiment

Introduction

Figure 4A:
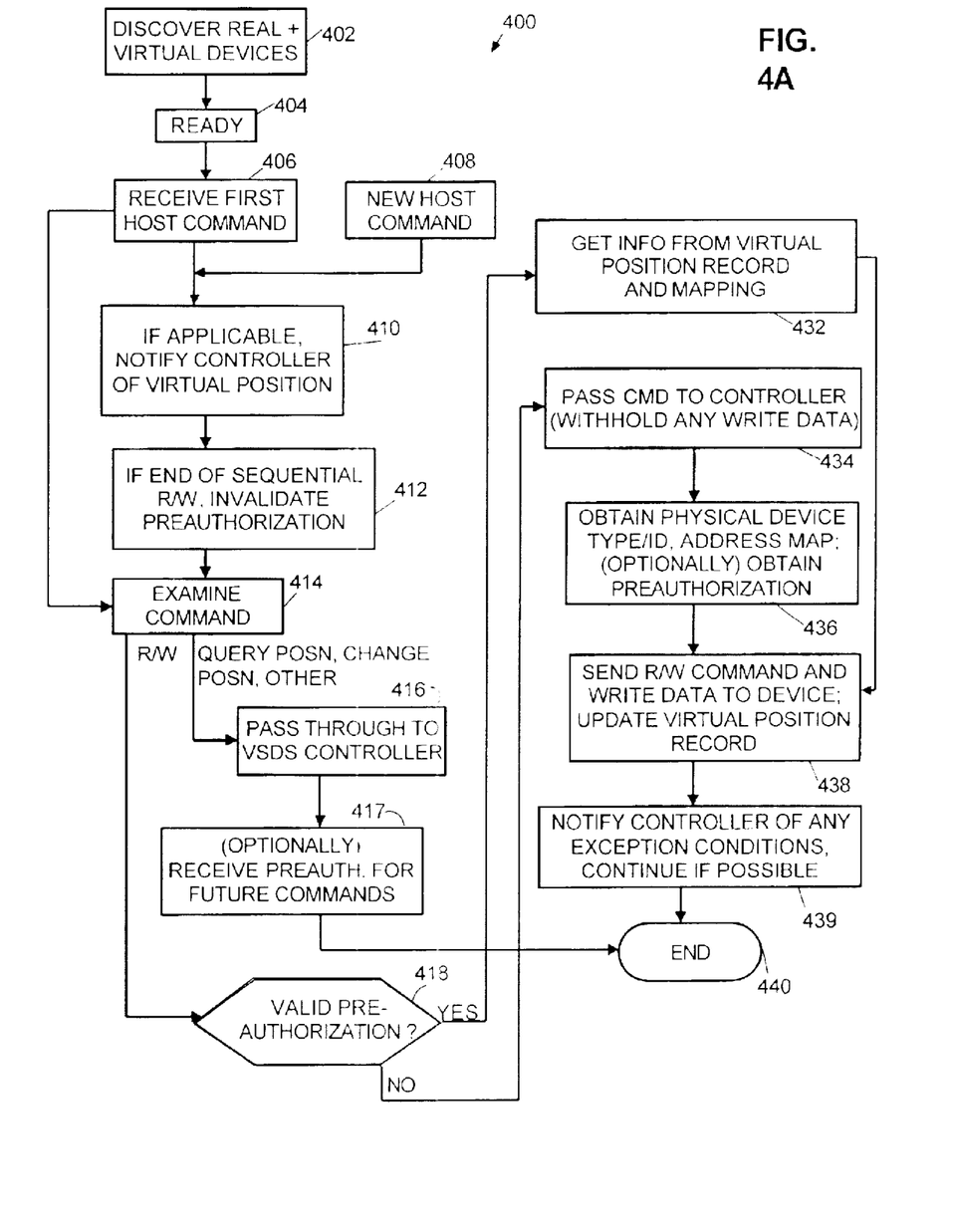
FIG. 4A is a flowchart of an operating sequence for a VSDS router, where the controller tracks VSDS position.

FIG. 4A shows a sequence 400 for operating the router 104 of the system 100 according to one embodiment of the present disclosure. Although the example of FIG. 4A is described in the specific context of the system 100, no limitation is intended thereby, as the sequence 400 may be implemented in other environments as will be apparent to ordinarily skilled artisans having the benefit of this disclosure.

Figure 4B:
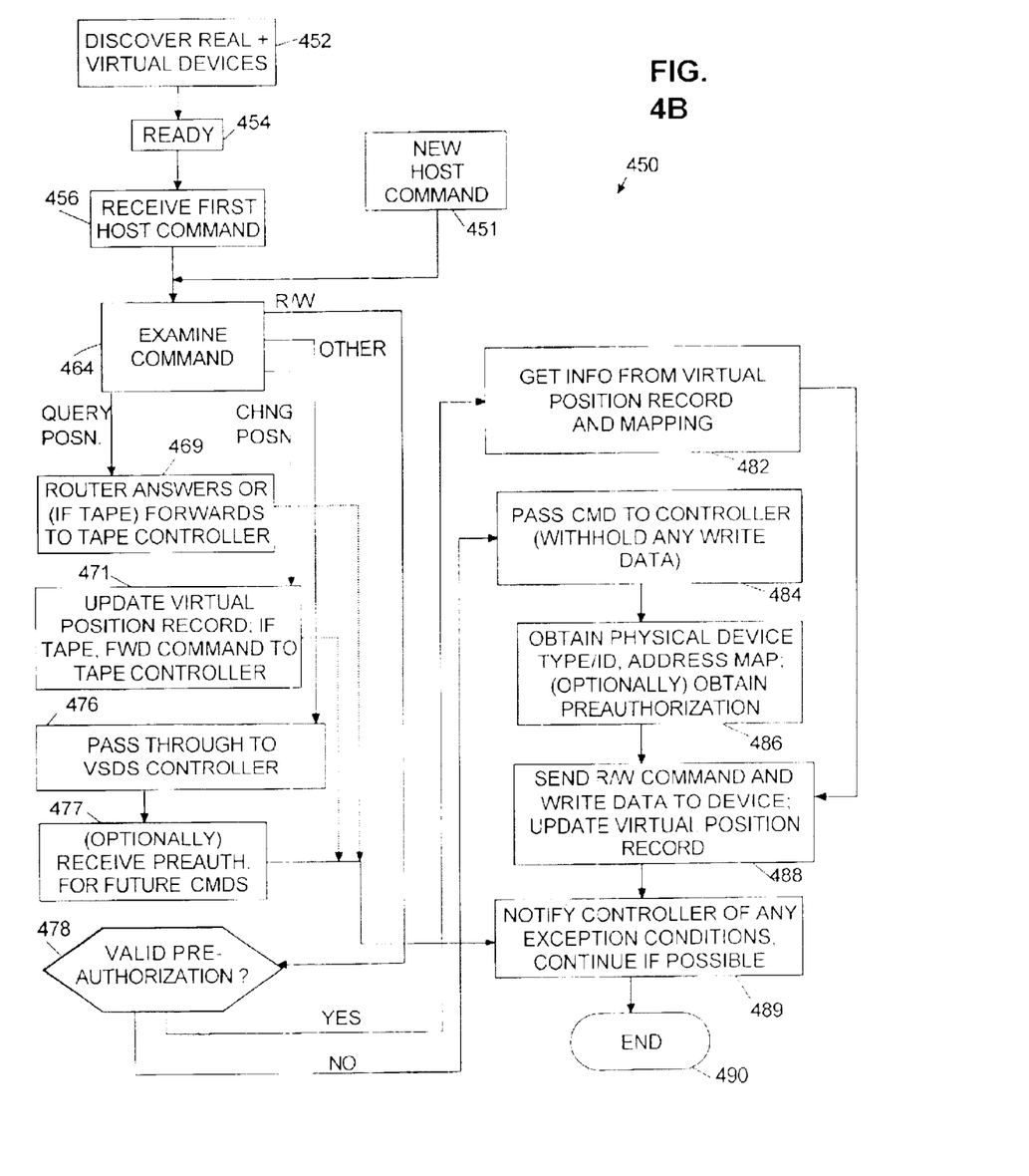
FIG. 4B is a flowchart of an operating sequence for a VSDS router, where the router tracks VSDS position.

In the sequence 400 (FIG. 4A) the controller 108 keeps track of VSDS position. Thus, the router 104 advises the controller 108 of the current virtual sequential media position at times (e.g., step 410) and also passes certain position related commands (e.g., 416) on for handling by the controller 108. In contrast, the sequence 450 (FIG. 4B) describes an embodiment where the router 108 keeps track of VSDS position. FIG. 4B is described separately, below.

Startup

The routine 400 is initiated in step 402, when the router 104 interrogates the VSDS subsystem 106 in order to determine the identity of the physical data storage devices (such as devices of disk 112 and tape storage 110), as well as the VSDS devices (not shown) that the controller 108 is representing to host applications 102. Step 402 may be implemented, for example, by the router 104 issuing a SCSI inquiry command to the controller 108. Step 402 may be performed during configuration, installation, startup, boot-up, reconfiguration, or other appropriate event of the router 104 and/or subsystem 106. In step 404, having completed step 402, the router 104 is ready to being operating. Optionally, the router 104 may also report its ready state to the host application 102 and/or VSDS controller 108 in step 404.

Host Command

In step 406, the router 104 receives a "host command" from the host application 102. Each host command is directed at the VSDS subsystem 106, as the router 104 is invisible to the host 102 (i.e., the host application 102 need not have any knowledge of the presence of the router 104). The host command being processed is referred to as the "current" host command.

Each host command comprises an instruction for the subsystem 106 to perform various tasks, such as:

a. READ COMMANDS—reading data from one or more virtual storage locations. Since the host application 102 regards storage in its virtual world, host read commands are phrased in terms of virtual storage locations identified by drive (location of virtual sequential media), sequential position (either an explicit or implicit address), and a length.

b. WRITE COMMANDS—writing data to one or more virtual storage locations. For example, WRITES may be phrased in terms of virtual storage locations identified by drive, sequential position, and length.

c. QUERY POSITION COMMANDS—asking for the current sequential position of the virtual sequential media.

d. CHANGE POSITION COMMANDS—asking to change the current sequential position of the virtual sequential media without performing a read or write operation.

e. OTHER COMMANDS—requesting status or any other information about data stored on imaginary (virtual) sequential media, or the imaginary (virtual) devices provided with access to such media.

Processing Host Command—Generally

After step 406, the routine 400 advances to step 410 (or optionally to step 414, since steps 410, 412 may be skipped for the first host command). In step 410, the router 104 determines whether it needs to update the controller 108 as to the current virtual position, and carries out such notification if needed. One condition under which the router 104 must update the controller 108 is where the router 104 has "valid preauthorization" (described below) from the controller 108 and the current host command is not a "sequential" read or write (which would presumably continue under the preauthorization). A read/write is sequential if it is directed at the next virtual position, in order, from the last read/write that was performed. With preauthorization, discussed in greater detail below, the controller 108 gives the router 104 advance permission to conduct read/write operations directly to the media 110, 112 without involving the controller 108 for each one. In the case of FIG. 4A, preauthorization only extends to sequential read/writes. Preauthorization is valid if the current host command, when carried out at the current virtual position (from record 150a), would remain within the limits of preauthorization (from mapping 150b). One circumstance under which the router 104 reports the current virtual position to the controller 108 occurs when the router 104 has been operating under controller preauthorization to read or write to a block of contiguous virtual locations (step 410); in this situation, the controller 108 has probably lost track of the current virtual position.

In addition to the condition regarding preauthorization (above), another condition where the router 104 must advise the controller 108 of virtual position (step 410) occurs when there is no valid preauthorization and the router 104 presumably needs to update the controller 108 of the current virtual position resulting from the last read/write operation from step 438, whether that read/write was conducted under preauthorization (now ended) or not.

After step 410, the router 104 invalidates preauthorization (if given) if the current host command is a read/write that is not sequential with the previous read/write. This is done to avoid the situation where the router 104 improperly regards preauthorization as still being in effect since preauthorization in the context of FIG. 4A only applies to sequential read/writes. Preauthorization may be invalidated by, for example, truncating the preauthorized positions in 150b so that the current virtual position 150a lies outside it, or entering a null value into 150a and/or 150b, etc.

After step 412, or after optionally skipping from step 406, the router 104 examines the current host command to determine the command type (step 414).

Processing Non-Read/Write Commands

If the current command is a query position, change position, or other non-read/write command, step 414 advances to step 416 where the router 104 passes the command to the controller 108. In this instance, the command can be passed to the controller 108 because it is not likely to substantially slow the operation of the controller 108 as it does not involve reading or writing data. In this case, the controller 108 will handle the command as discussed below in FIG. 5A. Some exemplary "other" commands include reading and/or setting logs, reading and/or setting operational modes, queries for status, and the like.

Optionally, after step 416, the router 104 may receive preauthorization for future read/write operations upon the tape 110 and/or disk storage 112 (step 417). Namely, the controller 108 may send preauthorization in anticipation of future read/write operations, to make them more efficient. As a specific example, the controller 108 may preauthorize the router 104 to utilize an identified block of contiguous virtual sequential media positions. Depending upon the mapping between virtual and physical addresses, these virtual positions may or may not correspond to a contiguous block of physical addresses. When the router 104 obtains an appropriate preauthorization mapping from the controller 108, the router 104 stores it in 150b.

After step 417, the routine 400 ends in step 440. The routine 400 is invoked anew in step 408, whenever the router 104 receives the next host command.

Processing Read/Write Commands

In contrast to steps 414/416, if the router 104 finds (step 414) that the current host command is a read or write command, step 414 proceeds to step 418. In step 418, the router 104 asks whether the router 104 is preauthorized to handle the requested read/write operation (i.e., whether preauthorization is valid for the host command). As mentioned above, when the router 104 initially receives preauthorization (e.g., step 417, 436), it stores the extent of preauthorization in the mapping 150b. Therefore, in order to tell whether preauthorization is valid, the router 104 references the virtual position record 150a, the mapping 150b, and the current host command. More particularly, step 418 may be achieved by examining the virtual sequential media position and length identified in the current host read/write command against the current virtual position 150a to see whether the specified data lies within the positions authorized by the mapping 150b.

If the current read/write command was not preauthorized, step 418 proceeds to step 434, where the router 104 passes the read/write command to the controller 108, withholding any write data from the controller 108 (if the current command is a write command). The router 104 also advises the controller 108 the current command is a "router-managed outboard read/write command." This means that the router 104 intends to manage the read/write operation directly at the storage 110, 112; the read/write data will therefore bypass the controller 108. Thus, the controller 108's cooperation is chiefly required to guide the router 104 in where to conduct the read/write operation in storage 110, 112, as the controller 108 will not relay any read/write data itself. The occurrence of a router-managed outboard read/write command may be signaled by a prearranged message, flag, command structure, syntax, or other notification from the router 104 to the controller 108.

After step 434, the router 104 obtains information from the controller 108 identifying the proper physical address to carry out the current read/write command (step 436). For instance, the router 104 may obtain a physical device type (e.g., tape or disk), physical device ID, address map between virtual sequential media positions and physical disk track and sectors, etc. Also in step 436, the router 104 may receive preauthorization from the controller 108 for the current read/write operation and any future sequential read/write operations. For instance, the controller 108 may give the router 108 preauthorization for any number of virtual sequential media storage blocks, such as ten, twenty, one hundred blocks, or even the entirety of one or more virtual sequential media items. If so, the router 104 stores the extent of preauthorization in the mapping 150b.

After step 436, the router 104 prepares instructions to carry out the current host read/write command without involving the controller 108 and sends them to the storage devices 110, 112. In the case of a write command, the router 104 also sends the associated write data to the device 110, 112. In the case of a read command, the router 104 instructs the device 110, 112 to return the read data directly to the host application 102 without involving the controller 108. Also in step 438, the router 104 updates its virtual position record 150a to reflect the new current virtual position after completion of the read/write.

After step 438, the router 104 in step 439 determines whether any exception conditions arose from step 438. Some examples of exception conditions include encountering a boundary condition, error, end of physical tape, etc. The router 104 advises the controller 108 of any such conditions in step 439. After step 439, the routine 400 ends in step 440.

In contrast to the foregoing description, if step 418 finds that the current read/write command is preauthorized, step 418 proceeds to step 432. In step 432, the router 104 obtains information needed to carry out the current read/write command, namely, where on disk 112 or tape storage 110 to conduct the next read/write. More particularly, the router 104 examines the virtual sequential media position (implicit or explicit) and length from the host read/write command which identifies the virtual positions to be read or written. The mapping 150b identifies which physical data storage locations in 110, 112 are mapped to the virtual sequential media positions to be read or written. The physical data storage location is identified by physical device type, physical device ID, sector, and track (in the case of physical disk), or physical tape drive and address (in the case of physical tape). This information together tells the router 104 exactly where to read or write next. After step 432, the router 104 proceeds to step 438 to carry out the preauthorized read/write command as discussed above.

Router Operation—Second Embodiment

Introduction

FIG. 4B shows a sequence 450 for operating the router 104 according to a different embodiment, where the router 104 always tracks the current virtual sequential position. In the sequence 400 (FIG. 4A), the router 104 only tracked the current virtual sequential position when conducting preauthorized read/writes. Thus, it was necessary for the router 104 to advise the controller 108 of the current virtual sequential media position at times (e.g., step 412) and also to pass certain position related commands (e.g., 416) on for handling by the controller 108.

In contrast, the sequence 450 (FIG. 4B) describes an embodiment where the router 108 always keeps track of VSDS position. Accordingly, the router 104 need not notify the controller 108 of current virtual media position, and fewer commands are forwarded for processing by the router 108. As another point of distinction, preauthorization in the sequence 450 is not limited to sequential read/writes. Rather, the controller 108 preauthorizes the router 104 to utilize whatever portion of virtual storage is beneficial under the circumstances; one example is preauthorizing the router 104 to use the entire remainder of a virtual sequential media item. The considerations of such preauthorization are discussed in greater detail in the context of FIG. 5B, below.

The router 104 tracks virtual sequential media position using the record 150a. The record 150a's use, then, is not limited to when the router 104 is acting under preauthorization. The router 104 senses whether preauthorization is valid by determining whether the current host command, if carried out at the current virtual position 150a, would remain within the limits 150b of preauthorization. The details of FIG. 4B are described below.

Although the example of FIG. 4B is described in the specific context of the system 100, no limitation is intended thereby, as the sequence 450 may be implemented in other environments as will be apparent to ordinarily skilled artisans having the benefit of this disclosure.

Startup

The routine 450 begins with steps 452, 454, which are performed in the same manner as steps 402, 404 described above in conjunction with FIG. 4A.

Host Command

In step 456 the router 104 receives a host command from the host application 102. This is similar to step 406, described above in conjunction with FIG. 4A.

Processing Host Command—Generally

Steps 410, 412 (of FIG. 4A) need not be performed, since the router 104 is tracking the virtual sequential media position to the exclusion of the controller 108, and particularly, using the virtual position record 150a as discussed in greater detail below. Therefore, upon receiving a host command (step 456), the router 104 examines the command (step 464). The router 104's handling of the command depends upon the type of command, as shown below.

Query Position

If the current command is a query position command, the router 104 answers with the current virtual sequential media position from 150a (step 469). Optionally, if the VSDS subsystem 106 virtualizes tape drives, leaving the details of physical media intact, and the current query position command happens to refer to a virtual position corresponding to physical tape 110 (as indicated by 150b), the router 104 may satisfy step 469 by forwarding the query position command to the tape controller (not shown) of the tape drive containing the requested tape.

After step 469, the routine 450 advances to step 489, discussed below. The routine 450 is invoked anew in step 451 whenever the router 104 receives the next host command.

Change Position

If the current command is a change position command, the router 104 updates the current virtual sequential media position record 150a accordingly (step 471). Optionally, if the VSDS subsystem 106 virtualizes tape drives but leaves the details of physical tape media intact (as discussed above), and the current change position command that happens to refer to a virtual position corresponding to physical tape 110 (as indicated by 150b), the router 104 may satisfy step 471 by forwarding the change position command to the tape controller of the tape drive containing the requested tape.

After step 471, the routine 450 goes to step 489, discussed below. The routine 450 is invoked anew in step 451 whenever the router 104 receives the next host command.

Other

If the current host command is another command than query position, change position, or read/write, then the router 104 forwards the command to the controller 108 (step 476). Examples of such commands include reading and/or setting logs, commands reading and/or setting operational modes, queries for status, etc. In this instance, the command can be passed to the controller 108 because it is not likely to substantially slow the operation of the controller 108 as it does not involve reading or writing data. In this case, the controller 108 handles the command as discussed below in FIG. 5B.

Optionally, after step 476, the router 104 may receive preauthorization for future operations upon the tape 110 and/or disk storage 112. Preauthorization (step 477) is issued and received in the same manner as discussed above in conjunction with FIG. 4A. After step 477 (or 476), the routine 450 goes to step 489, discussed below. Whenever the router 104 receives the next host command the routine 450 is invoked anew in step 451.

Processing Read/Write Commands

In contrast to steps 469, 471, 476, 471, if the router 104 finds (step 464) that the current host command is a read or write command, step 464 proceeds to step 478. Steps 478, 482, 484, 486, 488, 489, 490 are conducted in similar fashion as steps 418–440 described above in conjunction with FIG. 4A.

Controller Operation—First Embodiment

Figure 5A:
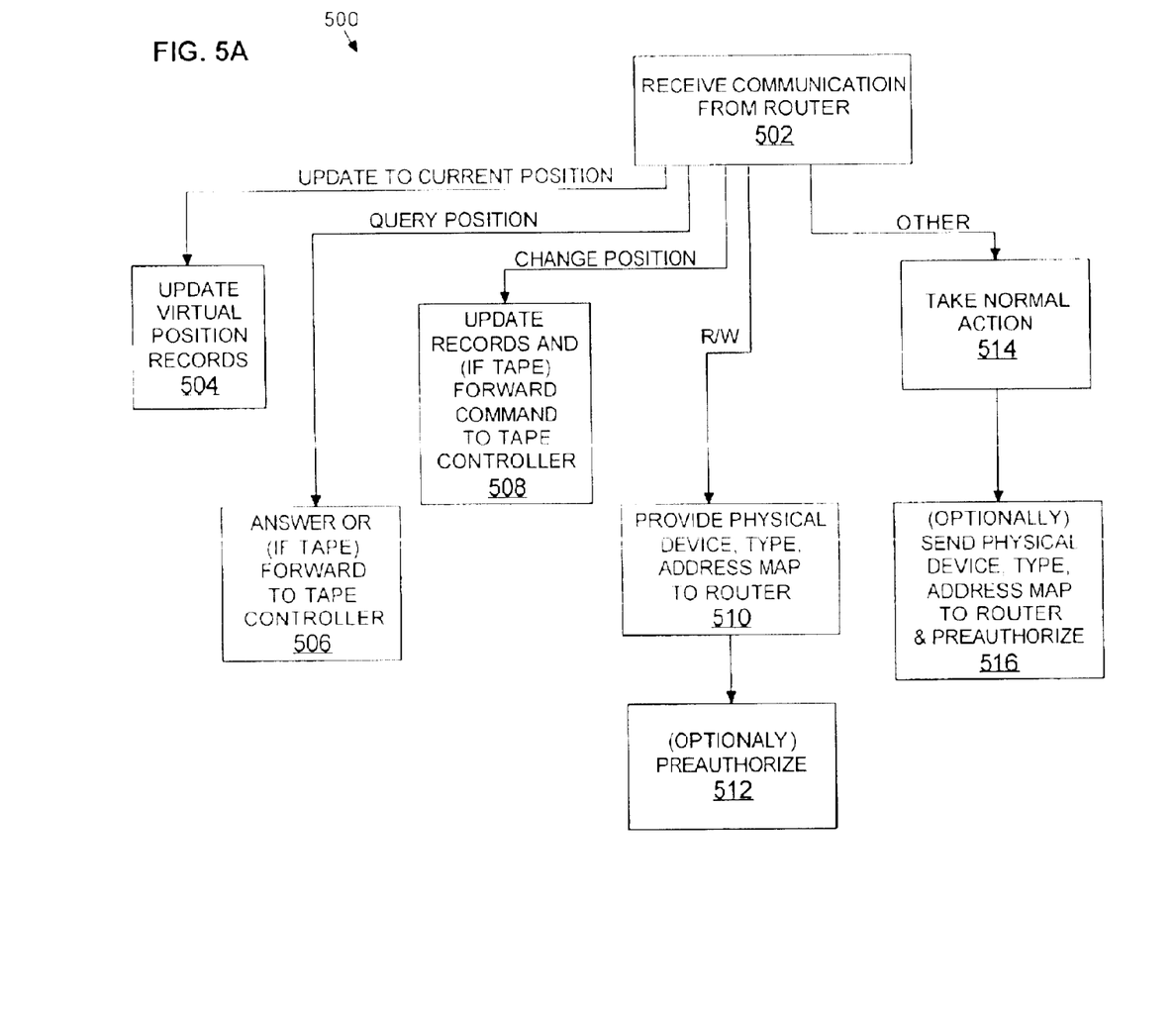
FIG. 5A is a flowchart of an operating sequence for a VSDS controller, where the controller tracks VSDS position.

FIG. 5A shows a sequence 500 for operating the controller 108 of the system 100 according to one embodiment of the present disclosure. In FIG. 5A, the controller 108 always tracks the current virtual sequential position. Thus, the sequence 500 corresponds to FIG. 4A. Although the example of FIG. 5A is described in the specific context of the system 100, no limitation is intended thereby, as the sequence 500 may be implemented in other environments as will be apparent to ordinarily skilled artisans having the benefit of this disclosure.

The steps are initiated in step 502, when the controller 108 receives communication from the router 104. As illustrated, the router 104 communications of step 502 include various commands forwarded from the host 102. The next actions of the controller 108 depend upon the type of communication received from the router 104.

Step 504 is performed responsive to step 410 of FIG. 4A. Here, the router is advising the controller of the current virtual position, having carried out various sequential reads or writes (step 438) on its own. In response, the controller 108 updates its own records of virtual position.

Step 506 is performed responsive to a query position command from the host application 102, forwarded to the controller 108 by the router 104 in step 416 (FIG. 4A). In step 506, the controller 108 answers the query position host command. This may be achieved using known techniques as taught by the IBM VTS product. For instance, the controller 108 itself may answer the host query if the current virtual sequential media position corresponds to a physical location in disk 112, or the controller 108 may forward the command to a tape controller in 110 if the current virtual sequential media position corresponds to a physical location in tape 110.

Step 508 is performed responsive to a change position command from the host application 102, forwarded to the controller 108 by the router 104 in step 416 (FIG. 4A). In step 508, the controller 108 conducts the requested change position operation. This may be achieved using techniques performed by the commercially available IBM VTS products. As part of step 508, the controller 108 updates its own records of current virtual sequential media position. And, if the current virtual sequential media position corresponds to a physical location in tape 110, the controller 108 may forward the command to a tape controller in 110.

If the current host command (step 502) is a read or write command, steps 510, 512 are performed. More particularly, step 510 is performed in response to the router 104 performing step 434 (FIG. 4A), which involves the router 104 forwarding a host read/write command to the controller 108 with an indication that the associated read/write data will bypass the controller 108. In step 510, the controller 108 provides the information identifying the proper physical address to carry out the current read/write command, as discussed above in step 436 (FIG. 4A). For instance, the controller 108 may provide a physical device type (e.g., tape or disk), physical device ID, address map between virtual sequential media positions and physical disk track and sectors, etc.

Optionally, the controller 108 may proceed to step 512, where it preauthorizes the router 108 to conduct some future read/write activity, as discussed above in conjunction with step 436 of FIG. 4A. For instance, the controller 108 may give the router 108 preauthorization for any number of virtual sequential media storage blocks, such as ten, twenty, one hundred, or even the entirety of one or more the virtual sequential media items. The controller 108's decision to preauthorize depends on the perceived tradeoff factors such as wasteful over-allocation of storage that may not be needed versus slower performance to get storage as needed.

Step 514 is performed responsive to an "other" command (i.e., not an update to current position, query position, change position, or read/write command) from the host 102 and forwarded by the router 104. This situation corresponds to step 416, FIG. 4A. In this case, the controller 108 takes action as taught by techniques of the commercially available IBM VTS products discussed above. Some exemplary "other" commands include reading and/or setting logs, reading and/or setting operational modes, queries for status, and the like.

Optionally, the controller 108 may preauthorize future operations in virtual sequential media by performing step 516, similar to step 512. In step 516, the controller 108 sends the router 104 information such as discussed above in step 417 (FIG. 4A).

Controller Operation—Second Embodiment

Figure 5B:
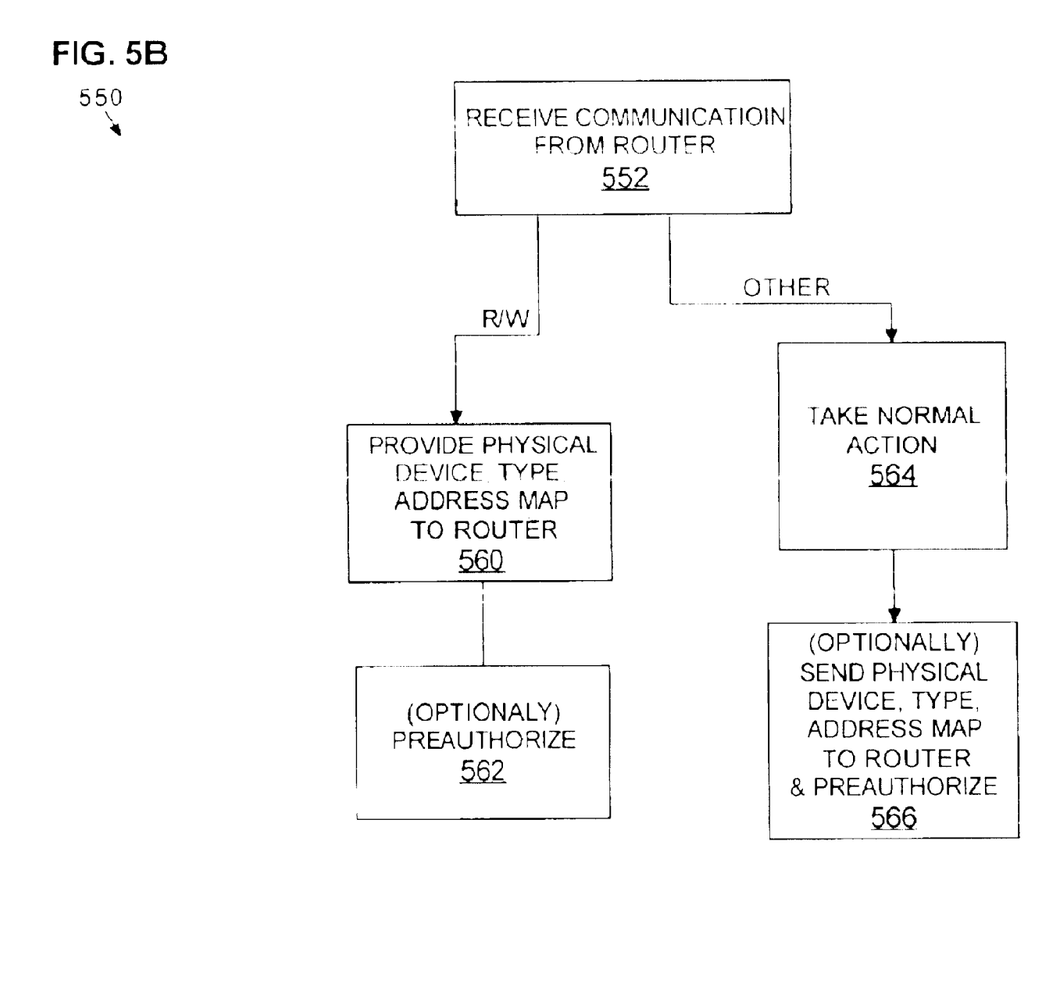
FIG. 5B is a flowchart of an operating sequence for a VSDS controller, where the router tracks VSDS position.

FIG. 5B shows a sequence 550 for operating the controller 108 of the system 100 according to a different embodiment of the present disclosure. Namely, in FIG. 5B, the router 104 tracks the current virtual sequential position, rather than the controller 108 tracking it. Thus, the sequence 550 corresponds to FIG. 4B. Although the example of FIG. 5B is described in the specific context of the system 100, no limitation is intended thereby, as the sequence 550 may be implemented in other environments as will be apparent to ordinarily skilled artisans having the benefit of this disclosure.

The steps are initiated in step 552, when the controller 108 receives communication from the router 104. As illustrated, the router 104 communications of step 502 include various commands forwarded from the host 102. The next actions of the controller 108 depend upon the type of communication received from the router 104.

If the current host command (step 502) is a read or write command, steps 560, 562 are performed. Step 560 is performed responsive to the router 104 performing step 484 (FIG. 4B), namely, the router 104 passing a read/write command to the controller 108 along with an indication that the associate read/write data will bypass the controller 108. In step 560, the controller 108 provides the information identifying the proper physical address to carry out the current read/write command, as discussed above in step 486 (FIG. 4B). For instance, the controller 108 may provide a physical device type (e.g., tape or disk), physical device ID, address map between virtual sequential media positions and physical disk track and sectors, etc.

Optionally, the controller 108 may proceed to step 562, where it preauthorizes the router 108 to conduct some future read/write activity, as discussed above in conjunction with step 486 of FIG. 4B. For instance, the controller 108 may give the router 108 preauthorization for any number of virtual sequential media storage blocks, such as ten, twenty, one hundred, or even the entirety of one or more virtual sequential media items.

Step 564 is performed responsive to an "other" command (i.e., not a query position, change position, or read/write command) from the host 102 and forwarded by the router 104. This situation corresponds to step 476, FIG. 4B. In this case, the controller 108 takes action as taught by techniques of the commercially available IBM VTS products discussed above. Some exemplary "other" commands include reading and/or setting logs, reading and/or setting operational modes, queries for status, and the like. Optionally, the controller 108 may preauthorize future operations in virtual sequential media by performing step 566, similar to step 562 discussed above. In step 566, the controller 108 sends the router 104 information as discussed above in conjunction with the corresponding step 477 (FIG. 4B).

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating a virtual sequential data storage system including a virtual sequential data storage system controller coupled to physical data storage, the controller coupled to a host machine including at least one host application, where the controller is configured to carry out commands from the host application referencing virtual sequential data storage, the method comprising operations of:

installing a router at the host;
the router intercepting prescribed types of host commands directed to the controller;
for each host read/write command intercepted by the router, performing read/write
processing operations comprising:
the router determining a target physical location in physical data storage to carry out the intercepted host read/write command;
if the host command is a read command, the router transferring data requested by the read command from the target physical location to the host application bypassing the controller;
if the host command is a write command, the router transferring write data associated with the write command from the host application to the target physical location bypassing the controller.

2. The method of claim 1, where the operation of installing a router comprises installing device driver software.

3. The method of claim 1, where at least some of the physical storage is implemented in disk storage, and target physical locations in the disk storage comprise files, and the virtual sequential data storage system includes one or more translation units to translate between files and surface areas of the disk storage.

4. The method of claim 1, where the operation of determining a target physical location in physical data storage to carry out the intercepted host read/write command comprises, responsive to selection of physical data storage comprising disk storage, or alternatively responsive to only disk storage being available as the physical data storage in the virtual sequential data storage system, the router determining a target physical location according to a file-based representation of physical data storage, and a translation unit translating between the file-based representation and surface areas of the disk storage.

5. The method of claim 1, where the operation of determining a target physical location in physical data storage comprises:

within a limited storage area previously authorized by the controller, the router calculating a suitable storage position in the physical data storage according to a predetermined algorithm.

6. The method of claim 1, where the operation of determining a target physical location in physical data storage comprises:

the router receiving a designation of the target physical location from the controller.

7. The method of claim 1, where the operations further comprise:

the controller preauthorizing the router to utilize a prescribed set of virtual sequential data storage locations;
responsive to preauthorization from the controller, the router conducting repeated transferring of read/write data free of communications with the controller for host read/write commands that can be carried out within limits of the prescribed set of virtual sequential data storage locations.

8. The method of claim 1, where:

the operations further comprise the router keeping track of a current virtual sequential data storage position.

9. The method of claim 8, where the operations further comprise:

responsive to receiving prescribed types of non-read/write host commands, the router satisfying the commands without involving the controller.

10. The method of claim 1, where:

the operations further comprise the controller keeping track of a position in the virtual sequential data storage;
the operations further comprising, responsive to receiving prescribed types of host non-read/write commands, the router forwarding the received commands for processing by the controller.

11. The method of claim 1, the read/write processing operations further comprising:

the router passing at least a portion of the intercepted command to the controller in association with a prescribed indication that data related to the intercepted command is bypassing the controller.

12. A signal-bearing medium tangibly embodying a program of machine-readable instructions executable by a digital processing apparatus to perform operations to manage a router in a virtual sequential data storage system including a virtual sequential data storage system controller coupled to physical data storage, the controller coupled to a host machine including at least one host application, where the controller is configured to carry out commands from the host application referencing virtual sequential data storage, and where the router is installed at the host, the operations comprising:

the router intercepting prescribed types of host commands directed to the controller;

for each host read/write command intercepted by the router, performing read/write processing operations comprising:

the router determining a target physical location in physical data storage to carry out the intercepted host read/write command;

if the host command is a read command, the router transferring data requested by the read command from the target physical location to the host application bypassing the controller;

if the host command is a write command, the router transferring write data associated with the write command from the host application to the target physical location bypassing the controller.

13. The medium of claim 12, where the router comprises device driver software.

14. The medium of claim 12, where at least some of the physical storage is implemented in disk storage, and target physical locations in the disk storage comprise files.

15. The medium of claim 12, where the operation of determining a target physical location in physical data storage to carry out the intercepted host read/write command comprises, responsive to selection of physical data storage comprising disk storage, or alternatively responsive to only disk storage being available as the physical data storage in the virtual sequential data storage system, the router determining a target physical location according to a file-based representation of physical data storage, and invoking a translation unit to translate between the file-based representation and surface areas of the disk storage.

16. The medium of claim 12, where the operation determining a target physical location in physical data storage comprises:

within a limited storage area previously authorized by the controller, the router calculating a suitable storage position in the physical data storage according to a predetermined algorithm.

17. The medium of claim 12, where the operation of determining a target physical location in physical data storage comprises:

the router receiving a designation of the target physical location from the controller.

18. The medium of claim 12, where the operations further comprise:

responsive to the router receiving preauthorization from the controller to utilize a prescribed set of virtual sequential data storage locations, the router conducting repeated transferring of read/write data free of communications with the controller for host read/write commands that can be carried out within limits of the prescribed set of virtual sequential data storage locations.

19. The medium of claim 12, where:

the operations further comprise the router keeping track of a current virtual sequential data storage position.

20. The medium of claim 19, where the operations further comprise:

responsive to receiving prescribed types of non-read/write host commands, the router satisfying the commands without involving the controller.

21. The medium of claim 12, where:

the operations further comprising, responsive to receiving prescribed types of host non-read/write commands, the router forwarding the received commands for processing by the controller.

22. The medium of claim 12, the read/write processing operations further comprising:

the router passing at least a portion of the intercepted command to the controller in association with a prescribed indication that data related to the intercepted command is bypassing the controller.

23. Logic circuitry of multiple interconnected electrically conductive elements configured to perform operations to manage a router in a virtual sequential data storage system including a virtual sequential data storage system controller coupled to physical data storage, the controller coupled to a host machine including at least one host application, where the controller is configured to carry out commands from the host application referencing virtual sequential data storage, and where the router is installed at the host, the operations comprising:

the router intercepting prescribed types of host commands directed to the controller;

for each host read/write command intercepted by the router, performing read/write processing operations comprising:

the router determining a target physical location in physical data storage to carry out the intercepted host read/write command;

if the host command is a read command, the router transferring data requested by the read command from the target physical location to the host application bypassing the controller;

if the host command is a write command, the router transferring write data associated with the write command from the host application to the target physical location bypassing the controller.

24. A virtual sequential data storage subsystem, comprising:

a virtual sequential data storage system including physical data storage and a controller coupled to the physical data storage, the controller coupled to a host machine including at least one host application, where the controller is configured to carry out commands from host applications referencing virtual sequential data storage;

a router installed at the host, coupled to the physical data storage, and configured to perform operations comprising:

intercepting prescribed types of host commands directed to the controller;

for each host read/write command intercepted by the router, performing read/write processing operations comprising:

determining a target physical location in physical data storage to carry out the intercepted host read/write command;

if the host command is a read command, transferring data requested by the read command from the target physical location to the host application bypassing the controller;

if the host command is a write command, transferring write data associated with the write command from the host application to the target physical location bypassing the controller.

25. A virtual sequential data storage subsystem, comprising:

a virtual sequential data storage system including physical data storage and a controller coupled to the physical data storage, the controller coupled to a host machine including at least one host application, where the controller is configured to carry out commands from host applications referencing virtual sequential data storage;

router means, installed at the host, for conducting selected operations outboard of the controller comprising:

intercepting prescribed types of host commands directed to the controller;

for each host read/write command intercepted by the router means, performing read/write processing operations comprising:

determining a target physical location in physical data storage to carry out the intercepted host read/write command;

if the host command is a read command, transferring data requested by the read command from the target physical location to the host application bypassing the controller;

if the host command is a write command, transferring write data associated with the write command from the host application to the target physical location bypassing the controller.

* * * * *